US012268910B2

(12) United States Patent
Seligson (10) Patent No.: US 12,268,910 B2
(45) Date of Patent: Apr. 8, 2025

(54) PRECISION AERIAL FIREFIGHTING AND DELUGE SYSTEM FOR HELICOPTERS AND UNMANNED AERIAL SYSTEMS

(71) Applicant: Brian Robert Seligson, Central, SC (US)

(72) Inventor: Brian Robert Seligson, Central, SC (US)

( * ) Notice: Subject to any disclaimer, the term of this patent is extended or adjusted under 35 U.S.C. 154(b) by 103 days.

(21) Appl. No.: 17/515,772

(22) Filed: Nov. 1, 2021

(65) Prior Publication Data
US 2022/0134152 A1    May 5, 2022

Related U.S. Application Data

(60) Provisional application No. 63/107,588, filed on Oct. 30, 2020.

(51) Int. Cl.
*A62C 3/02* (2006.01)
*B64D 1/16* (2006.01)

(52) U.S. Cl.
CPC .......... *A62C 3/0242* (2013.01); *A62C 3/0214* (2013.01); *A62C 3/0271* (2013.01); *B64D 1/16* (2013.01)

(58) Field of Classification Search
CPC ... A62C 3/0242; A62C 3/0214; A62C 3/0271; B64D 1/16; F42B 12/68; F42B 30/14; F42B 12/36–70
USPC .......................................................... 169/53
See application file for complete search history.

(56) References Cited

U.S. PATENT DOCUMENTS

| | | | | |
|---|---|---|---|---|
| 2,776,817 A * | 1/1957 | Yeatman | ................. | E21B 17/07 175/48 |
| 3,494,423 A * | 2/1970 | Stansbury | ................ | B64D 1/16 169/53 |
| 3,714,987 A * | 2/1973 | Mattson | .................... | B64D 1/16 169/53 |
| 4,421,204 A * | 12/1983 | Lawrence | ................ | A62B 5/00 182/51 |
| 5,135,055 A * | 8/1992 | Bisson | ..................... | B64D 1/16 169/53 |
| 6,092,911 A * | 7/2000 | Baker, III | ............... | A62C 27/00 362/543 |
| 6,209,593 B1 * | 4/2001 | Nichols, Sr. | ............. | B64D 1/16 141/2 |
| 7,275,889 B1 * | 10/2007 | McGill | ................... | E01F 13/12 404/6 |
| 9,333,379 B2 * | 5/2016 | Zimmerman | .......... | A62C 31/12 |

(Continued)

*Primary Examiner* — Tuongminh N Pham
(74) *Attorney, Agent, or Firm* — Martin S. High, P.C.

(57) ABSTRACT

The precision aerial firefighting and deluge system for helicopters and unmanned aerial systems is a device to attack fires inaccessible to firefighters due to altitude or other obstructions by streaming water or other fire retardant into or onto a specific location on the ground, on the water, or at altitude. The system employs a medium or heavy lift helicopter or unmanned aerial systems one or more tanks or bladders for water and/or fire retardant chemicals, a compressed air foam system, a pump, rigid plumbing lines for outflow of water/fire retardant; a rigid, telescopic boom that extends beyond rotor tip path plane, flexible lines/hoses inside boom; a crew switched electronic boom controller, a boom management system, a flange adapter, an electric, variable direction, crew-controlled fire monitor, a drop-hose, and a dart with inertial feathers.

15 Claims, 11 Drawing Sheets

(56) References Cited

U.S. PATENT DOCUMENTS

| | | | | |
|---|---|---|---|---|
| 2003/0146045 A1* | 8/2003 | Porter, Jr. | ............... | F42B 12/68 |
| | | | | 182/11 |
| 2010/0058966 A1* | 3/2010 | Fong | ........................ | B63G 9/00 |
| | | | | 416/111 |
| 2014/0263819 A1* | 9/2014 | Wilson | ................... | B64D 27/00 |
| | | | | 244/17.11 |
| 2018/0043194 A1* | 2/2018 | Zimmerman | .......... | A62C 5/022 |

* cited by examiner

PRECISION AERIAL FIREFIGHTING AND DELUGE SYSTEM FOR HELICOPTERS AND UNMANNED AERIAL SYSTEMS

STATEMENT REGARDING FEDERALLY SPONSORED RESEARCH OR DEVELOPMENT

Not applicable

BACKGROUND OF THE EMBODIMENTS

The general field of the embodiments of the Precision Aerial Firefighting and Deluge System for Helicopters and Unmanned Aerial Systems (UAS) is firefighting equipment. More specifically, the field of the embodiments is fire equipment for locations not normally accessible by conventional methods, such as high elevation buildings and structures. High altitude structures and buildings are difficult for ground-based fire fighters to reach, attack, and extinguish. Fires in upper stories of the buildings require fire fighters to reach the floor of the building and deploy the resources available at that floor to attempt to extinguish the fire. This deployment takes time that allows the fire to spread and put human life and property in danger.

BRIEF SUMMARY OF THE EMBODIMENTS

An objective of the embodiments of the Precision Aerial Firefighting and Deluge System for Helicopters and Unmanned Aerial Systems (UAS) is a device to attack fires inaccessible to firefighters due to altitude or other obstructions by streaming water or other fire retardant into or onto a specific location on the ground, on the water, or at altitude.

The purpose of the embodiments are the implementation of an aerial platform capable of streaming water or other fire retardant into or onto a specific location on the ground, on the water, or at altitude. It is worth noting, if just two of these aircraft had been in use in 2001 in New York City, they likely would have rapidly attacked the fires in the World Trade Center buildings on September 11, preventing the collapse and saving thousands of lives.

Therein has thus been outlined, rather broadly, the more important features of the embodiments in order that the detailed description thereof that follows may be better understood, and in order that the present contribution to the art may be better appreciated. There are, of course, additional features of the embodiments that will be described hereinafter and which will form the subject matter of the claims appended hereto.

In this respect, before explaining at least one embodiment of the embodiments in detail, it is to be understood that the embodiment is not limited in this application to the details of construction and to the arrangements of the components set forth in the following description or illustrated in the drawings. The embodiment or embodiments are capable of other embodiments and of being practiced and carried out in various ways. Also, it is to be understood that the phraseology and terminology employed herein are for description and should not be regarded as limiting. As such, those skilled in the art will appreciate that the conception, upon which this disclosure is based, may readily be used as a basis for the designing of other structures, methods and systems for carrying out the several purposes of the embodiments. Additional benefits and advantages of the embodiments will become apparent in those skilled in the art to which the present embodiments relate from the subsequent description of the preferred embodiment and the appended claims, taken in conjunction with the accompanying drawings. It is important, therefore, that the claims be regarded as including such equivalent constructions insofar as they do not depart from the spirit and scope of the embodiments.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the embodiments of the application, which is measured by the claims, nor is it intended to be limiting as to the scope of the embodiments in any way.

DETAILED DESCRIPTION OF THE EMBODIMENTS

Figure 4A:
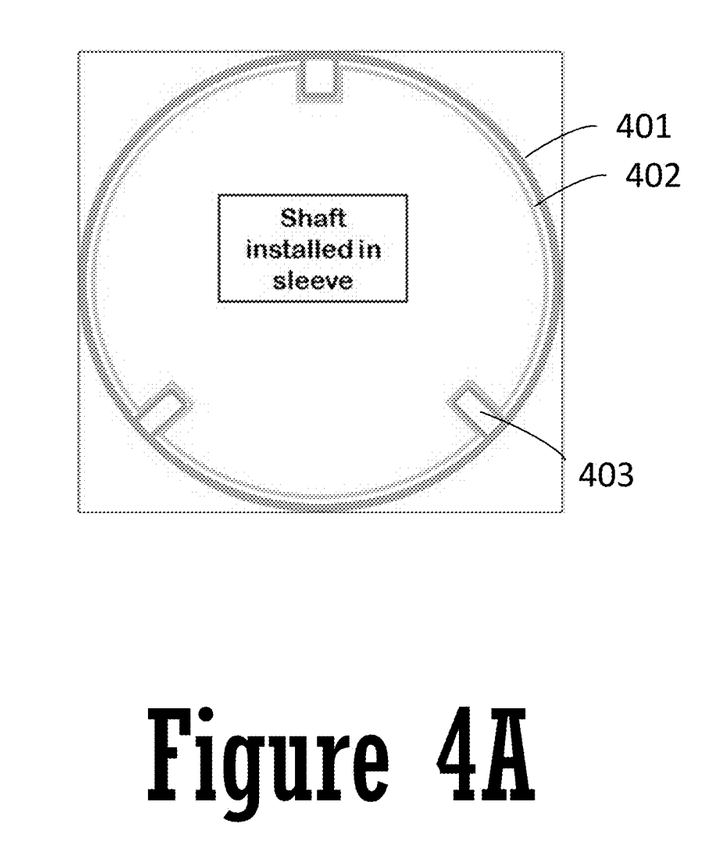
FIG. 4A shows an embodiment of the Precision Aerial Firefighting and Deluge System for Helicopters and UAS showing a cross section of the boom showing the inner and outer sleeves of the boom.
Figure 4B:
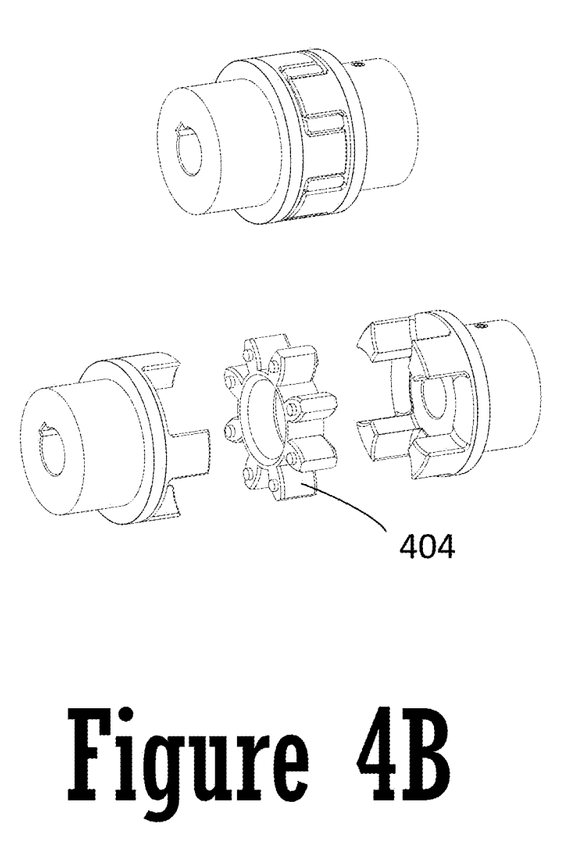
FIG. 4B shows another embodiment of the Precision Aerial Firefighting and Deluge System for Helicopters and UAS showing an assembly diagram of a typical jaw clutch to prevent boom rotation.
Figure 5A:
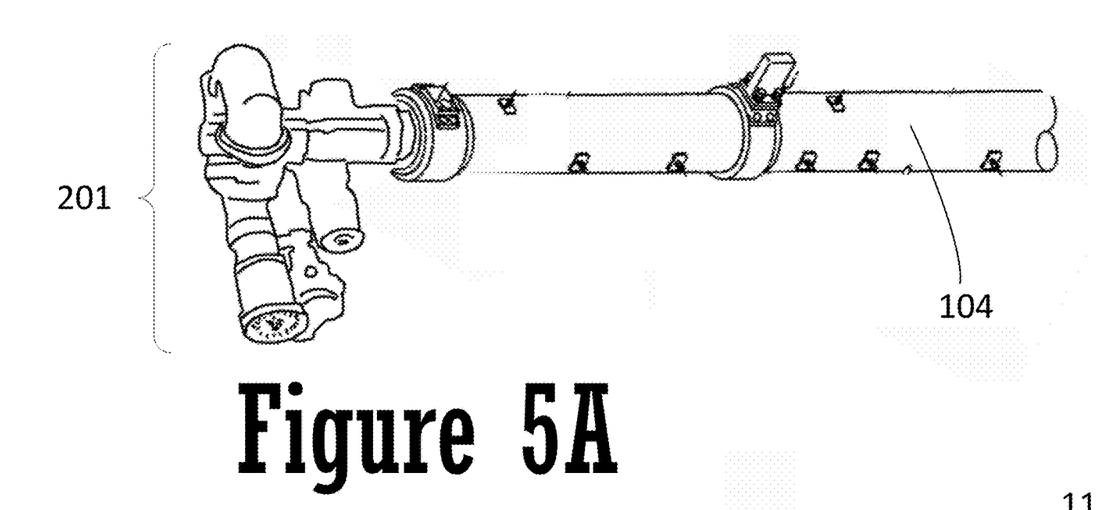
FIG. 5A shows an embodiment of the Precision Aerial Firefighting and Deluge System for Helicopters and UAS showing an embodiment of the boom in the retracted position.
Figure 5B:
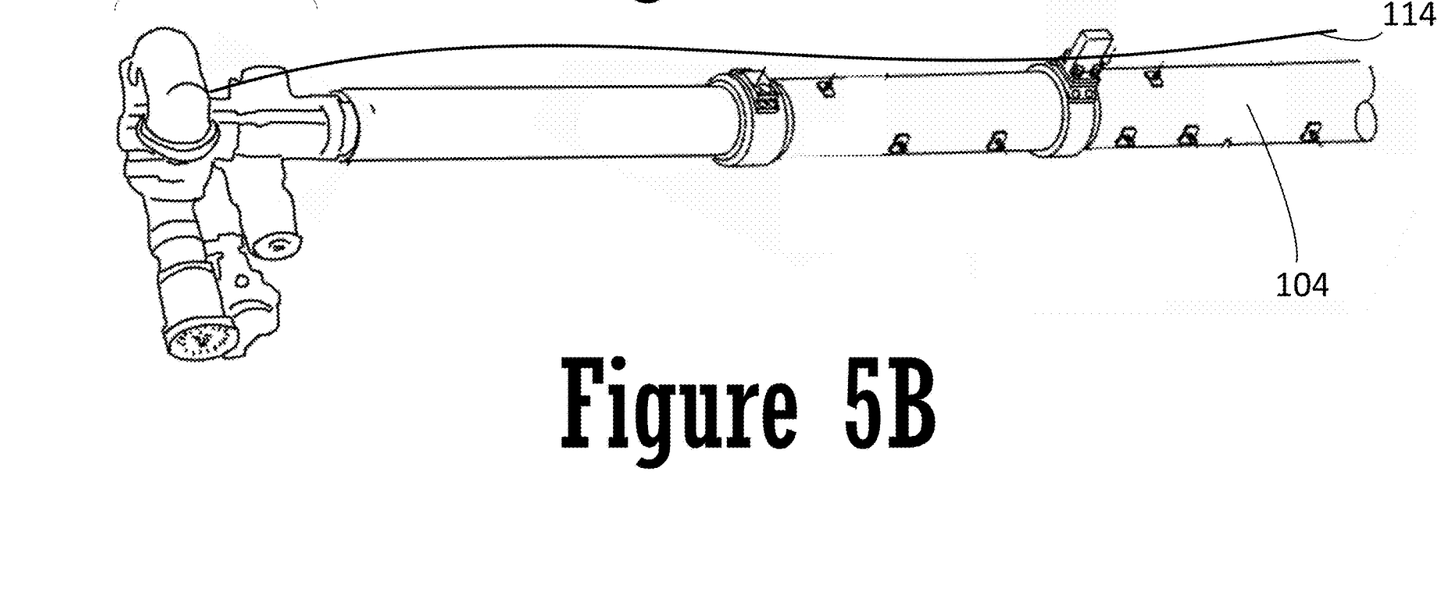
FIG. 5B shows an embodiment of the Precision Aerial Firefighting and Deluge System for Helicopters and UAS showing an embodiment of the boom in the extended position.
Figure 6:
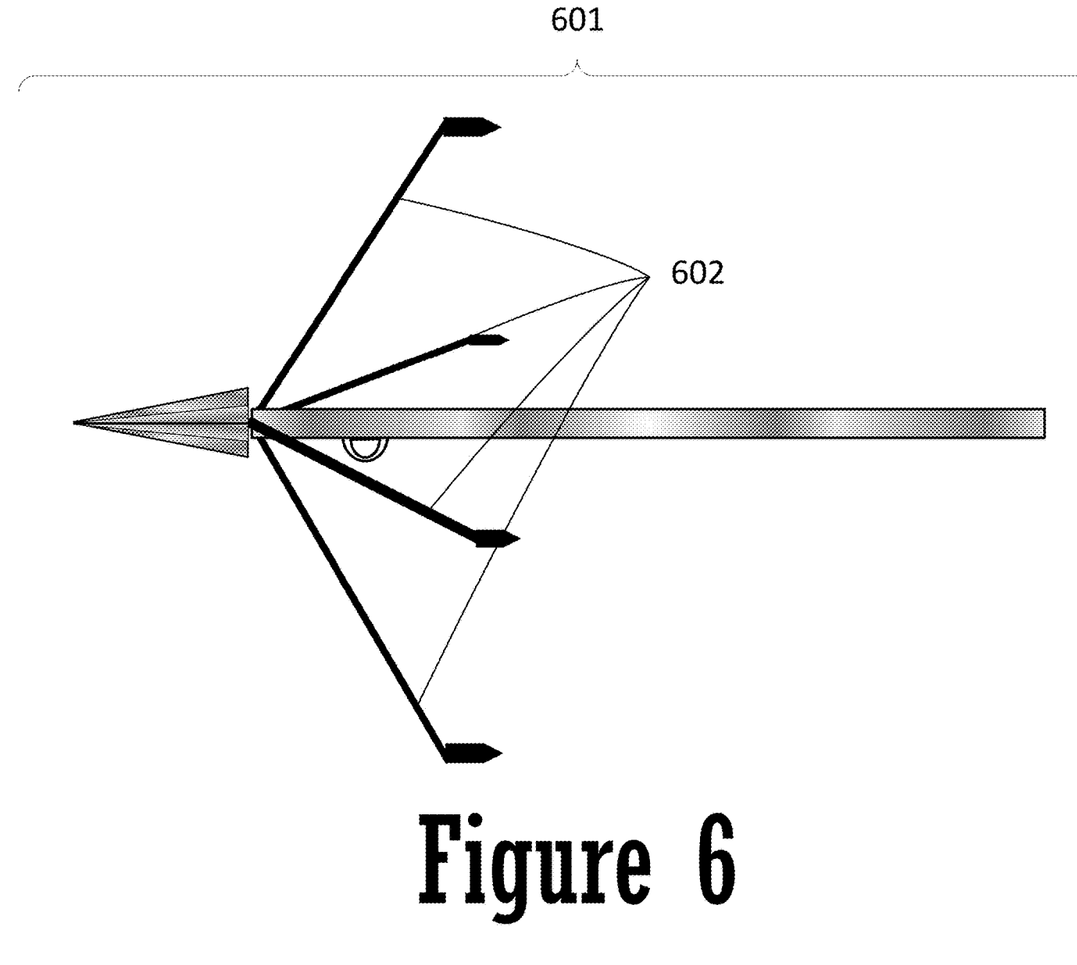
FIG. 6 shows an embodiment of the Precision Aerial Firefighting and Deluge System for Helicopters and UAS showing an embodiment of the high strength window penetrator.
Figure 7:
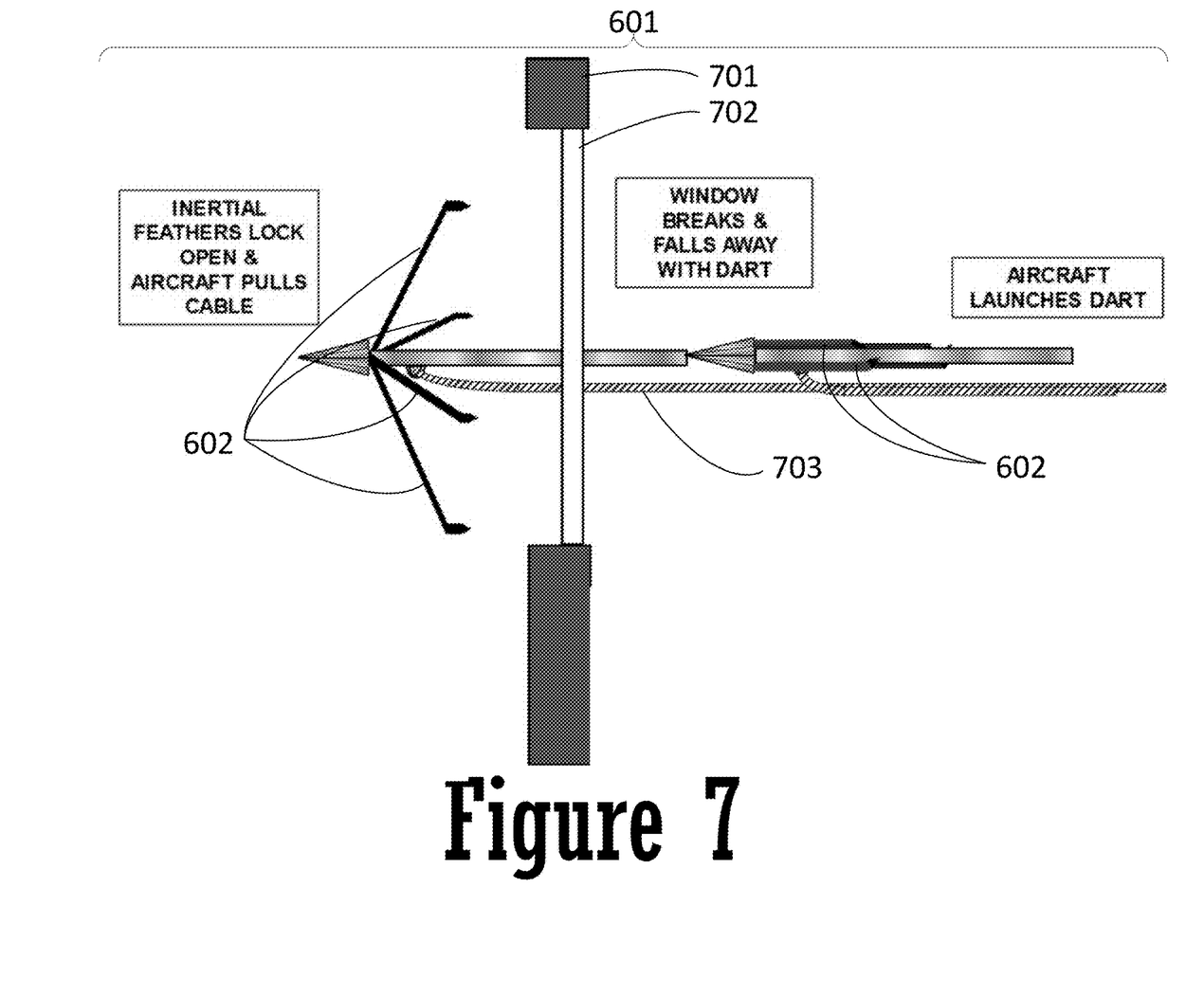
FIG. 7 shows an embodiment of the Precision Aerial Firefighting and Deluge System for Helicopters and UAS showing another embodiment of the high strength window penetrator.
Figure 8A:
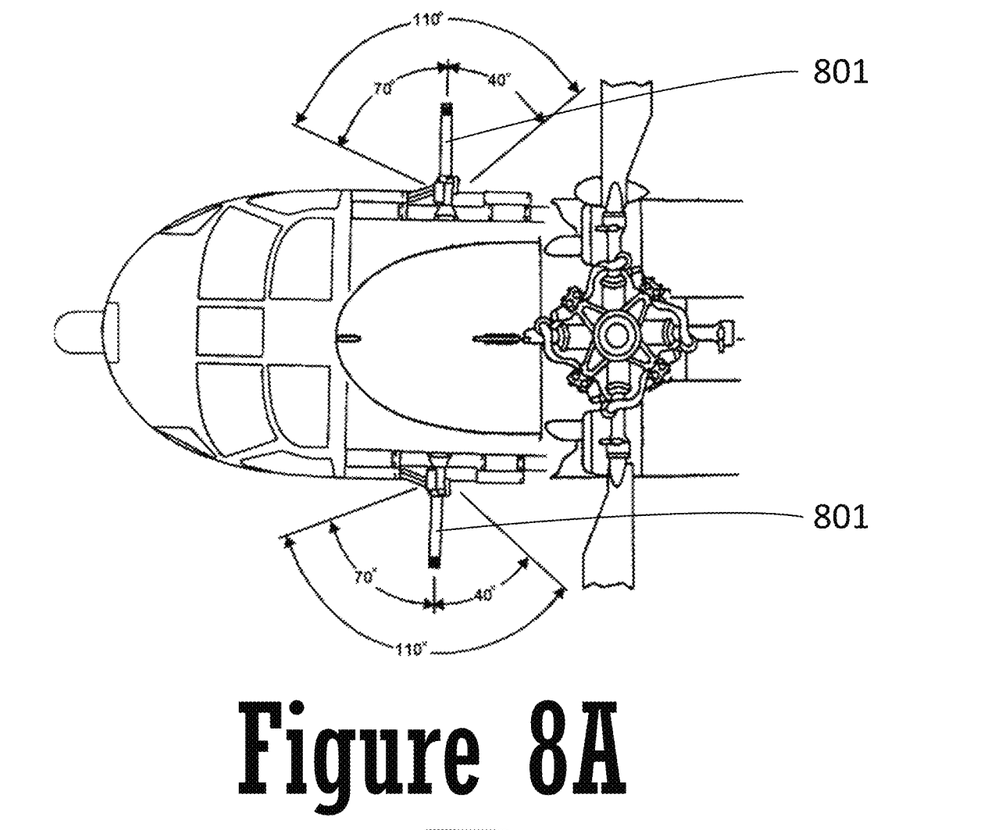
FIG. 8A shows a top view of an embodiment of the Precision Aerial Firefighting and Deluge System for Helicopters and UAS showing placements of the airframe mounting locations and elevation and azimuth limitations for the high strength window penetrator.
Figure 8B:
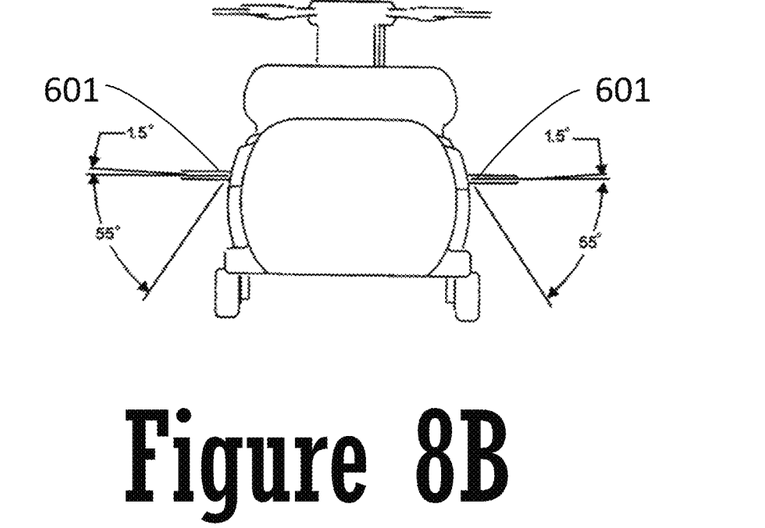
FIG. 8B shows a front view of an embodiment of the Precision Aerial Firefighting and Deluge System for Helicopters and UAS showing placements of the airframe mounting locations and elevation and azimuth limitations for the high strength window penetrator.

Embodiments of the Precision Aerial Firefighting and Deluge System for Helicopters and Unmanned Aerial Systems (UAS) 100 are comprised of a multi-turbine engine utility or cargo helicopter or UAS 101; one or more tanks or bladders for water and/or fire retardant chemicals 102; a compressed air foam system (CAFS) pallet 106 with foam concentrate ingredient; a pump (Power Take Off (PTO), electric, gasoline, or hydraulic driven or any other power supply means) to pressurize outflow lines (max 400 psi) 107; rigid plumbing lines for outflow of water/fire retardant (>500 psi) 103; a rigid, telescopic boom (mounted alongside of the helicopter/UAS and pointing forward) 104 to extend beyond rotor tip path plane with internal longitudinal lugs/rails or clutch, 403 or 404, to prevent shaft spin (see FIGS. 4A and 4B); flexible lines/hoses 202 inside boom for outflow of water/fire retardant/foam; a crew switched electronic boom controller 108 to activate pump and valves to extend and retract the telescopic boom 104; a boom management system 111; a flange adapter 301; an electric, variable direction, crew-controlled fire monitor 902; a tensioned, self-winding cable reel 113 for the electrical connection 114 to the fire monitor 902; a second pump to pressurize tank refill hose 110; a drop-hose 109 to temporarily hang outside helicopter to dip into water source for remote refill of tanks; a dart or harpoon gun (pneumatic or percussion fired) mounted at crew/gunner station (either side) 801; a dart 601 with inertial "feathers" 602 to penetrate and remove or break high-strength building windows 702; a cable with cable brake and emergency cable shear capability and distance limiter for dart 703; Fast Rope Insertion/Extraction System (FRIES) bars to deploy firefighters as necessary 1001; fast ropes 1002 to deploy and extract firefighters and equipment as necessary; and an on-board FLIR system 105.

The crew switched electronic boom controller 108 is electronically connected to the boom management system 111. The crew switched electronic boom controller 108 electronically activate pumps and valves via the boom management system 111. The crew switched electronic boom controller 108 electronically connects to an electrical or hydraulic system to extend and retract the telescopic boom 104.

Figure 1:
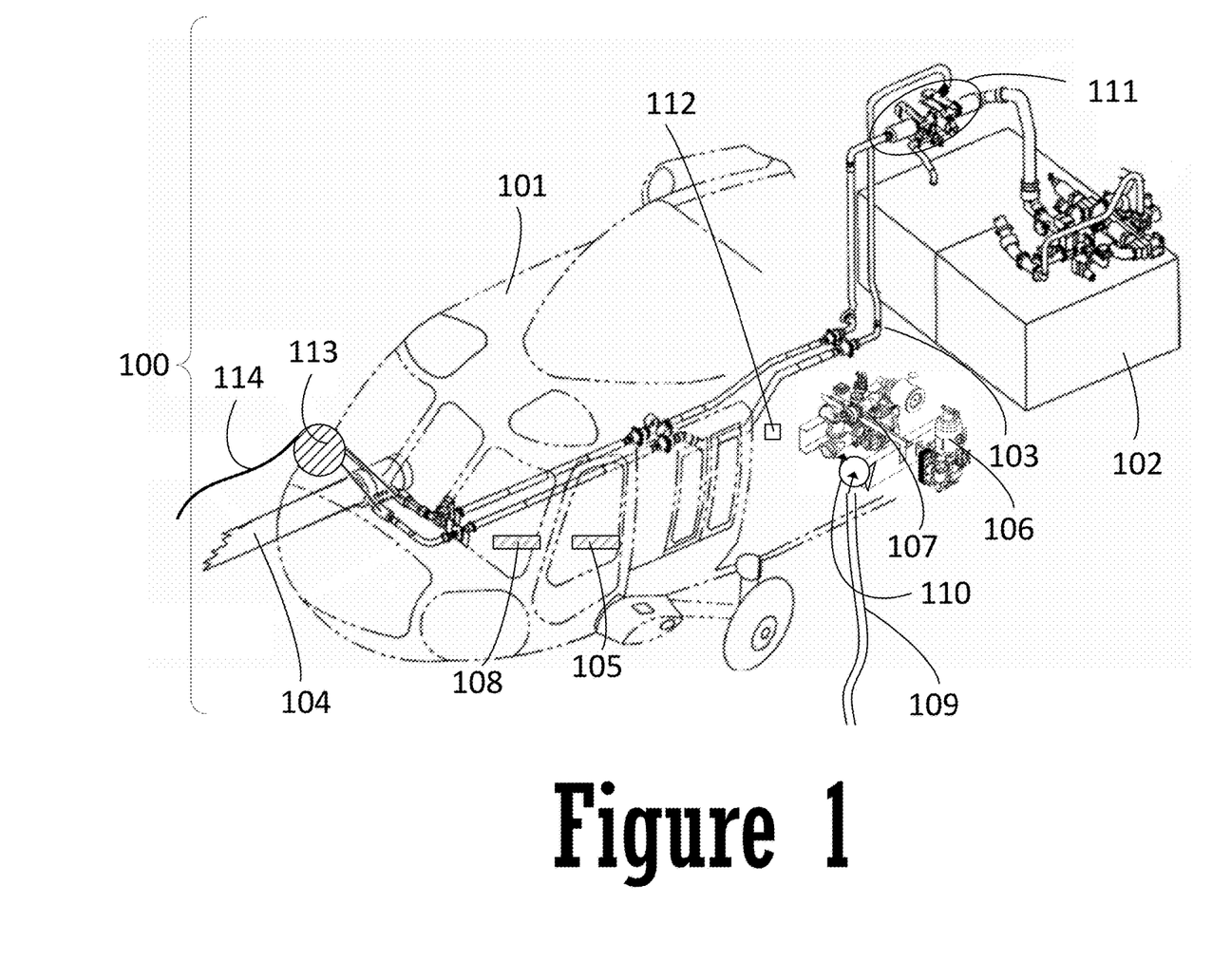
FIG. 1 shows an embodiment of the Precision Aerial Firefighting and Deluge System for Helicopters and Unmanned Aerial Systems (UAS) showing the relative placement of the fluid tanks and the boom to the fuselage of the helicopters or UAS.
Figure 2:
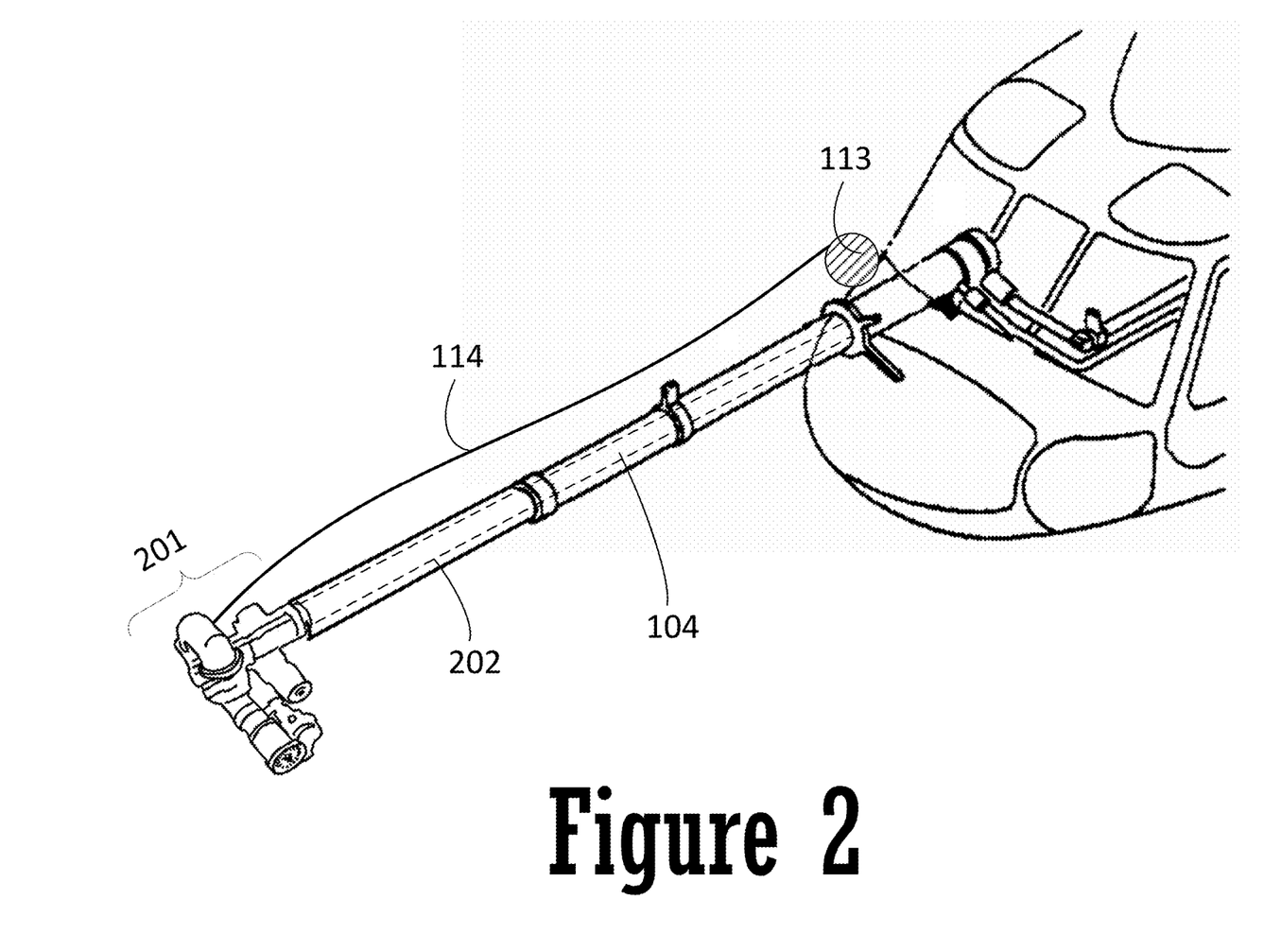
FIG. 2 shows an embodiment of the Precision Aerial Firefighting and Deluge System for Helicopters and UAS showing the placement of the boom and fire monitor.
Figure 11:
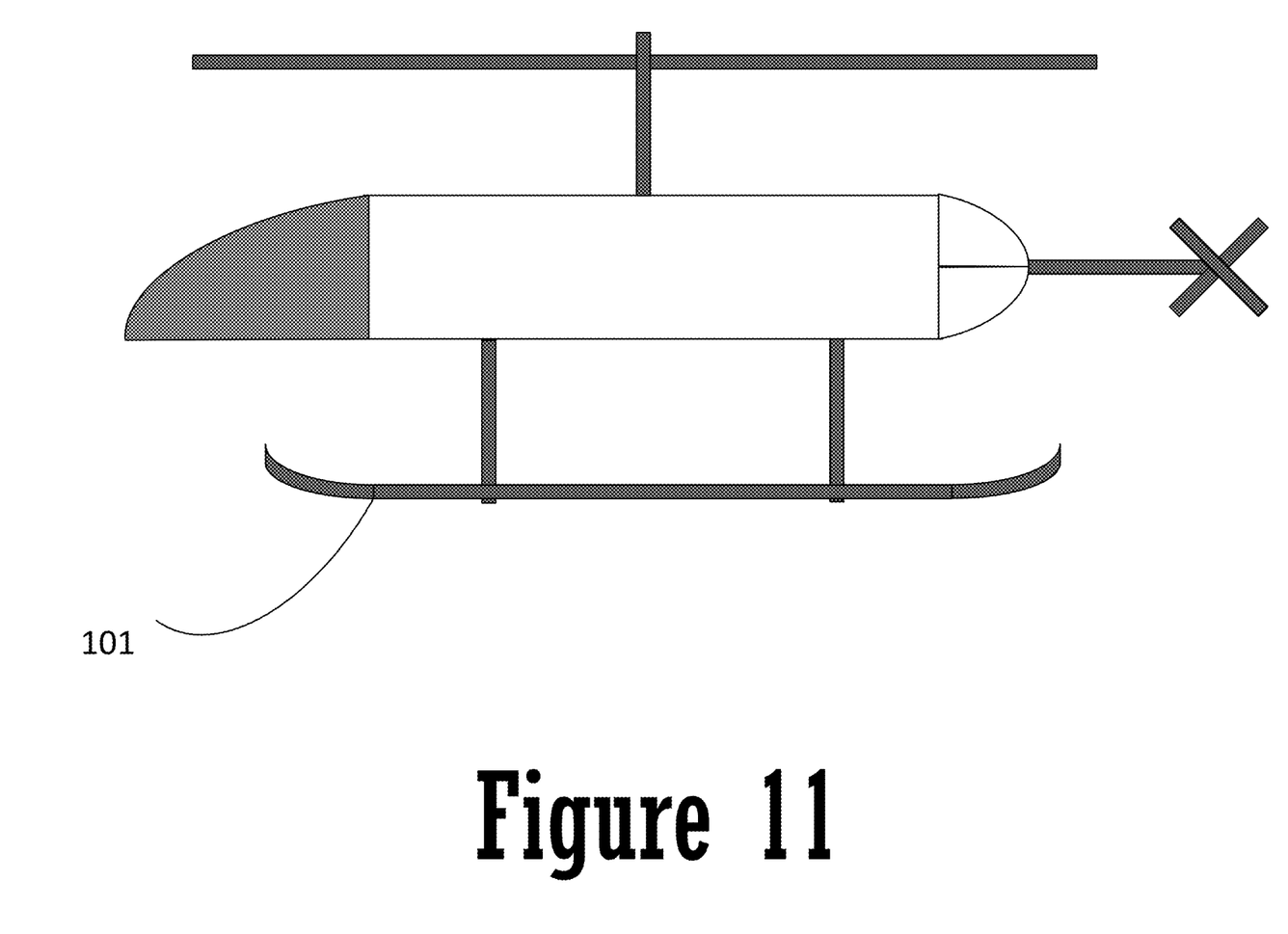
FIG. 11 shows an embodiment of the Precision Aerial Firefighting and Deluge System where one embodiment of the Unmanned Aerial System [101] is an unmanned helicopter.

The multi-turbine engine utility or cargo helicopter or UAS 101 is any medium or heavy lift helicopter or UAS including the Sikorsky UH-60 helicopter and its variants.

The one or more tanks or bladders for water and/or fire-retardant chemicals 102 contains the fire-retardant materials to be deployed. The compressed air foam system (CAFS) pallet 106 contains the foam concentrate material used to make fire retardant foam when mixed in the CAFS system. The pump 107 (PTO, electric, gasoline or hydraulic driven or any other power supply means) to pressurize outflow lines (max 400 psi). Also, the pump 107 is used to pump water and retardant through the CAFS to the boom. The rigid plumbing lines for outflow of water/fire retardant (≥500 psi) 103 form the fluid connection to the boom.

The rigid, telescopic boom 104 is mounted alongside of the helicopter/UAS parallel to the long axis of the helicopter/UAS and pointing forward. The boom 104 telescopes forward to extend beyond the rotor tip path plane. The boom 104 comprises internal longitudinal lugs/rails or clutch, 403 or 404, that prevent shaft spin (see FIGS. 4A and 4B). The boom 104 is also comprised of rigid or flexible lines or hoses 202 inside the boom for outflow of water/fire retardant/foam.

Figure 3A:
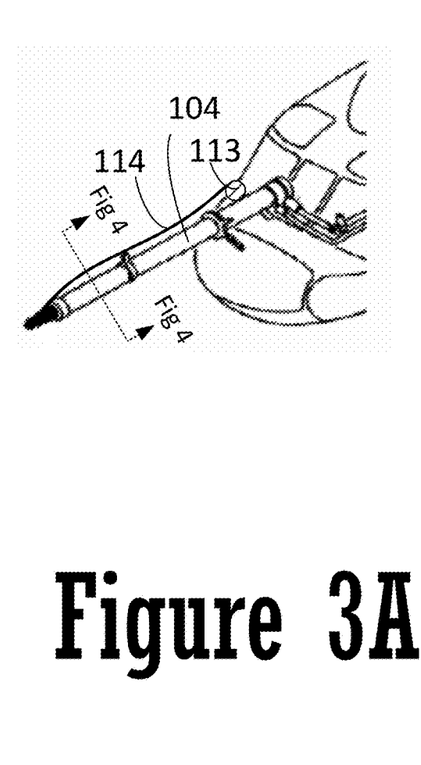
FIG. 3A shows an embodiment of the Precision Aerial Firefighting and Deluge System for Helicopters and UAS showing the monitor coupling adapter located at the end of the boom.
Figure 3B:
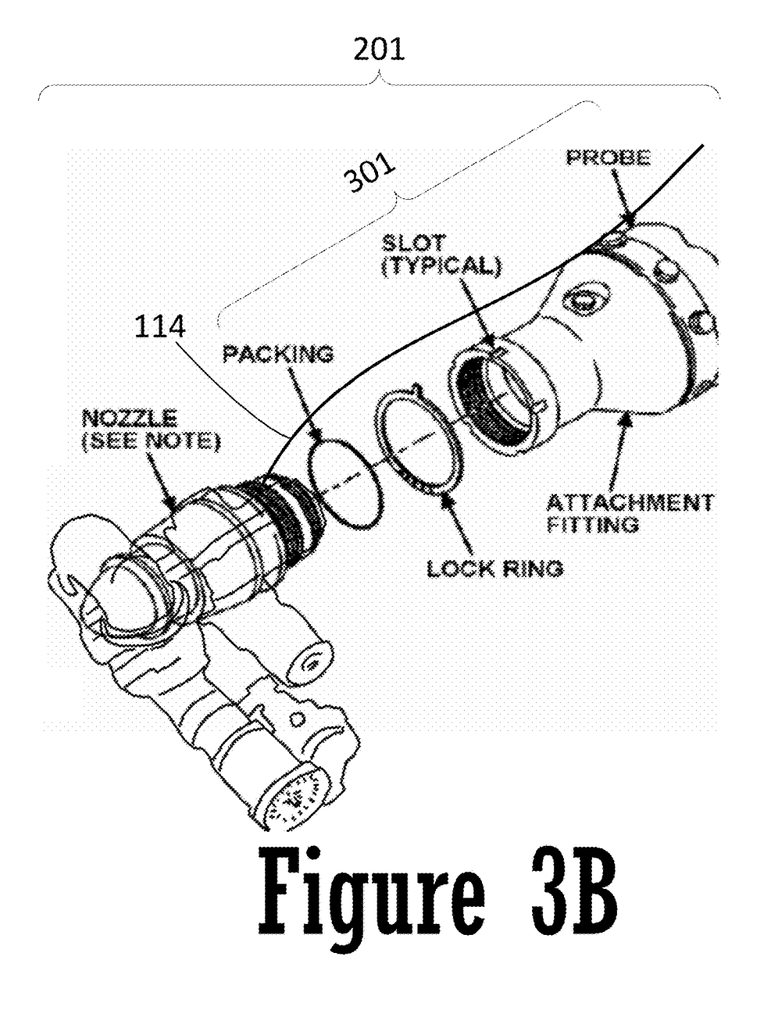
FIG. 3B shows an embodiment of the Precision Aerial Firefighting and Deluge System for Helicopters and UAS showing an assembly diagram for the monitor tip.

The crew switched electronic boom controller 108 is used to activate pump and valves and to extend and retract telescopic boom. The boom management system 111 is comprised of a combination of valves and switches that connect the tanks to the boom to extend and retract the telescopic boom 104. The flange adapter 301 connects the boom end to an electric, variable direction, crew-controlled fire monitor 201.

Figure 9A:
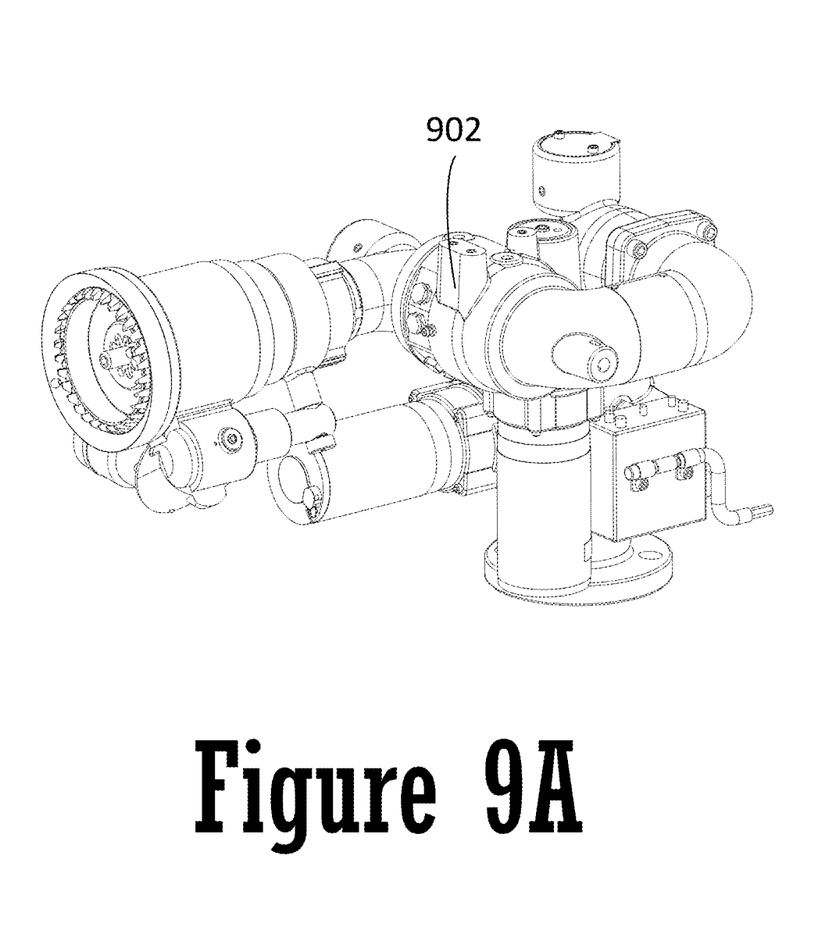
FIG. 9A shows an embodiment of the Precision Aerial Firefighting and Deluge System for Helicopters and UAS showing the crew controlled directional monitor.
Figure 9B:
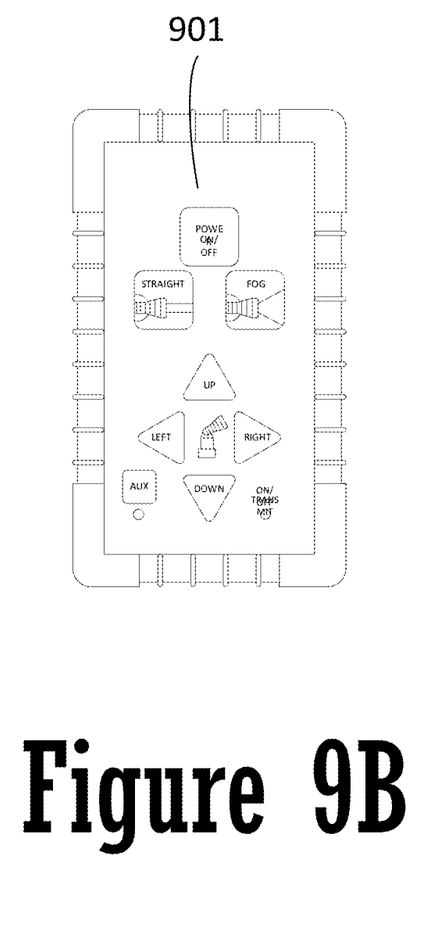
FIG. 9B shows an embodiment of the Precision Aerial Firefighting and Deluge System for Helicopters and UAS showing the crew-operated directional monitor control.

The electric, variable direction, crew-controlled fire monitor 902 is used supply the water/retardant or foam to the desired location at the direction, rate, and flow pattern specified by the crew. The tensioned, self-winding cable reel will be added to the boom for the electrical connection to the fire monitor 201.

A second pump 110 is used to pressurize tank refill hose 109. The drop-hose 109 temporarily hangs outside helicopter to dip into water source for remote refill of tanks at a hover.

The dart 601 is a pneumatic or percussion fired projectile mounted at a crew station on either side of the helicopter/UAS. The dart 601 includes inertial "feathers" that allow the dart 601 to penetrate and then remove or break high-strength building windows 702. The reel 112 comprises a cable 703 with cable brake and emergency cable shear capability and distance limiter for the dart 601.

Figure 10:
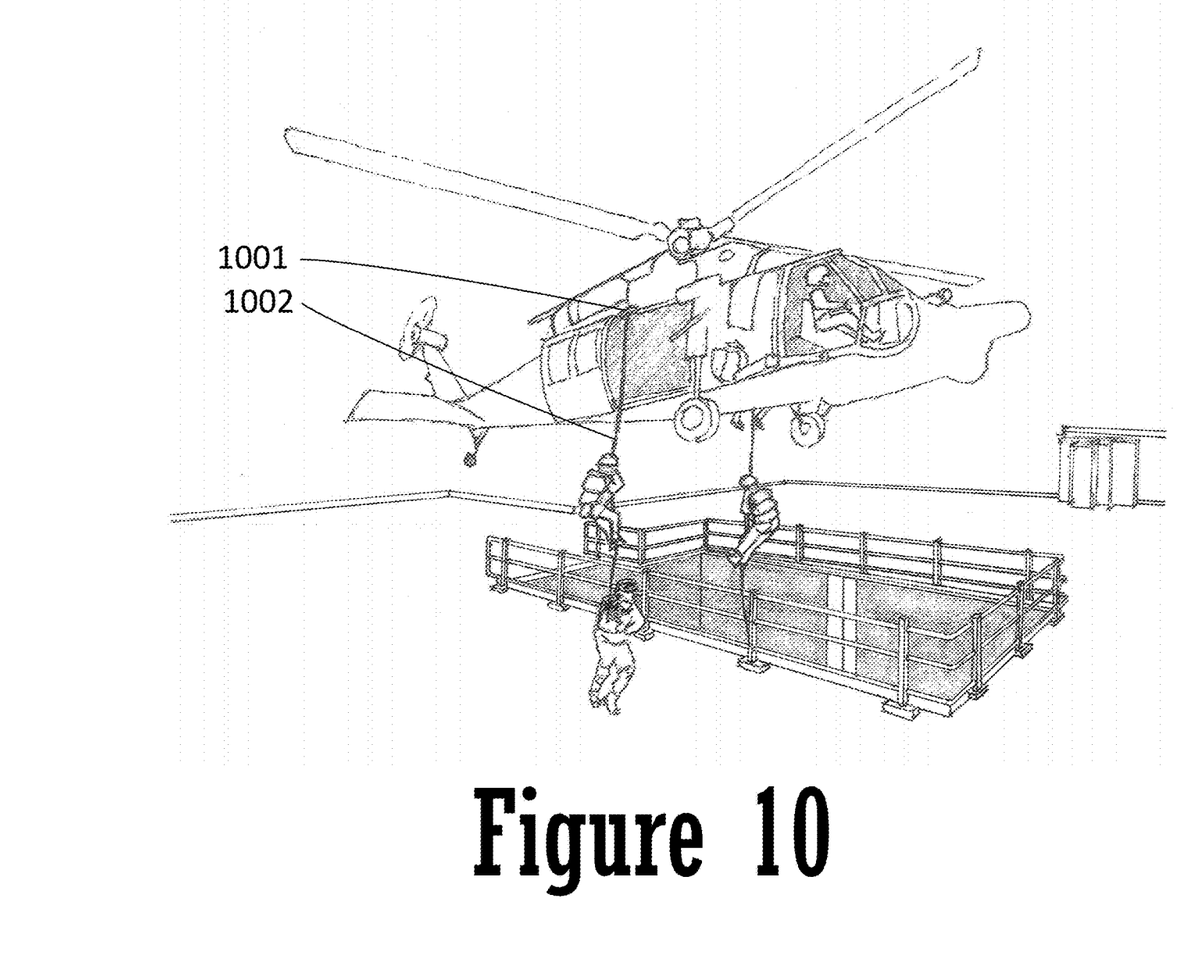
FIG. 10 shows an embodiment of the Precision Aerial Firefighting and Deluge System for Helicopters and UAS showing the placement of Fast Rope Insertion/Extraction System (FRIES) bars and ropes to deploy and extract firefighters and equipment.

The fast rope insertion/extraction system (FRIES) bars 1001 permit the insertion and extraction of firefighters as necessary via fast ropes and 1002.

The on-board forward-looking infrared (FLIR) system 105 provides navigational and situational awareness capabilities necessary in night and visibility limited operations as well as personnel locations and identification. An on-board FLIR (Forward Looking Infra-Red) optical system 105 can facilitate locating hot-spots, obstacles, and personnel in, near, or around the area.

Lastly, except for the below-deck and internal plumbing and wiring, all of the major components can be removed and reinstalled in order to facilitate other useful mission configurations of the aircraft. The boom will have quick-disconnect fittings for ease of removal and reinstallation. The CAFS system will be mounted to a pallet which can be installed and removed via the use of cabin floor tiedown fittings. The water tanks can be removed and reinstalled manually and restrained in the cabin with a harness and securing straps using the cabin floor tiedown fittings.

Embodiments of the Precision Aerial Firefighting and Deluge System for Helicopters and Unmanned Aerial Systems 100 can be used as an aerial platform capable of streaming water or other fire retardant into or onto a specific location on the ground, on the water, or at altitude. This system will enable, but is not limited to, firefighting capabilities at locations and altitudes normally inaccessible to ground-based firefighting equipment. It's worth noting, if just two of these aircraft had been in use in 2001 in New York City, they likely would have rapidly attacked the fires in the World Trade Center buildings on September 11, and may have prevented the collapse, saving thousands of lives.

Embodiments of the Precision Aerial Firefighting and Deluge System for Helicopters and Unmanned Aerial Systems 100 can be used to access a fire on upper floors of a high-rise building that can be attacked through window access, while at a hover with water, foam, or other fire-retardant.

The embodiments of the Precision Aerial Firefighting and Deluge System for Helicopters and Unmanned Aerial Systems 100 can aid Firefighters to be inserted onto the roofs or upper deck landings to rapidly assess, assist, and attack internal fires without having to climb up countless flights of stairs.

The embodiments of the Precision Aerial Firefighting and Deluge System for Helicopters and Unmanned Aerial Systems 100 can attack a fire on an aircraft carrier's flight deck or operations tower that can be attacked with foam or CAFS from altitude and stand-off distance with indigenous equipment and crew.

The embodiments of the Precision Aerial Firefighting and Deluge System for Helicopters and Unmanned Aerial Systems 100 can attack structure or vehicle fires where ground-based firefighters are unable to access, such as in the event of a violent riot, can be assessed and attacked from altitude.

The embodiments of the Precision Aerial Firefighting and Deluge System for Helicopters and Unmanned Aerial Systems 100 can access am overturned fuel tanker on a crowded freeway or highway with no ground/road access for firefighting.

The embodiments of the Precision Aerial Firefighting and Deluge System for Helicopters and Unmanned Aerial Systems 100 can allow for a railroad or shipboard chemical spill to be rapidly attacked while maintaining safe distance.

The embodiments of the Precision Aerial Firefighting and Deluge System for Helicopters and Unmanned Aerial Systems 100 can allow for in-flight de-icing of fixed, aerial structures such as wind power turbine generators, high tension wires and stanchions, and antennae and other aerials.

What is claimed is:

1. A precision aerial firefighting and deluge system for a rotorcraft, the system comprising
    the rotorcraft wherein the rotorcraft is a multi-turbine engine utility helicopter, a cargo helicopter, or an unmanned aerial system;
    one or more tanks or bladders for water or fire retardant chemicals;
    a pump to pressurize outflow lines;
    plumbing lines for outflow of water or fire retardant;
    a telescopic boom;
    an electric, variable direction, fire monitor;
    a switched electronic boom controller;
    a tensioned, self-winding cable reel; and
    a second pump to pressurize a tank refill hose,
    a pneumatic or percussion dart with a plurality of inertial feathers to penetrate and remove or break building windows;
    a compressed air foam system (CAFS) pallet comprising a foam concentrate used to make fire retardant foam when mixed in the CAFS system on the pallet;
    wherein the pump pressurizes the outflow lines;
    wherein the self-winding cable reel comprises a cable and cable brake having an emergency cable shear capability and distance limiter for the dart.

2. The precision aerial firefighting and deluge system for the rotorcraft described in claim 1, wherein the telescopic boom extends beyond a rotor tip path plane.

3. The precision aerial firefighting and deluge system for the rotorcraft described in claim 1, wherein the telescopic boom comprises internal longitudinal lugs or rails or clutch.

4. The precision aerial firefighting and deluge system for the rotorcraft described in claim 1 comprising lines or hoses inside the boom.

5. The precision aerial firefighting and deluge system for the rotorcraft described in claim 1 comprising a boom management system.

6. The precision aerial firefighting and deluge system for the rotorcraft described in claim 1 comprising a flange adapter.

7. The precision aerial firefighting and deluge system for the rotorcraft described in claim 6 wherein the telescopic boom extends beyond a rotor tip path plane.

8. The precision aerial firefighting and deluge system for the rotorcraft described in claim 7 wherein the telescopic boom comprises internal longitudinal lugs or rails or a clutch.

9. The precision aerial firefighting and deluge system for the rotorcraft described in claim 8 comprising lines or hoses inside the boom.

10. The precision aerial firefighting and deluge system for the rotorcraft described in claim 9 comprising a boom management system.

11. The precision aerial firefighting and deluge system for the rotorcraft described in claim 10 comprising a flange adapter.

12. The precision aerial firefighting and deluge system for the rotorcraft described in claim 11 comprising a drop-hose.

13. The precision aerial firefighting and deluge system for the rotorcraft described in claim 12 comprising a personnel fast rope insertion and extraction system.

14. The precision aerial firefighting and deluge system for the rotorcraft described in claim 13 comprising an on-board forward-looking infra-red system.

15. The precision aerial firefighting and deluge system for the rotorcraft described in claim 14 wherein the switched electronic boom controller is used to activate the pump and valves and to extend and retract telescopic boom.

* * * * *